United States Patent
Gupta et al.

(10) Patent No.: US 12,058,000 B2
(45) Date of Patent: Aug. 6, 2024

(54) NETWORK DEVICE UPGRADE BASED GROUP PRIORITY

(71) Applicant: Juniper Networks, Inc., Sunnyvale, CA (US)

(72) Inventors: Manoj Gupta, Bangalore (IN); Rupamjyoti Sarma Baruah, Bangalore (IN); Gorakhanath Kathare, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/066,626

(22) Filed: Dec. 15, 2022

(65) Prior Publication Data
US 2024/0007350 A1    Jan. 4, 2024

(30) Foreign Application Priority Data
Jul. 1, 2022    (IN) .............................. 202241038046

(51) Int. Cl.
*H04L 41/082* (2022.01)
*H04L 41/0894* (2022.01)
*H04L 43/062* (2022.01)

(52) U.S. Cl.
CPC ........ *H04L 41/082* (2013.01); *H04L 41/0894* (2022.05); *H04L 43/062* (2013.01)

(58) Field of Classification Search
CPC .. H04L 41/082; H04L 41/0894; H04L 43/062
See application file for complete search history.

(56) References Cited

U.S. PATENT DOCUMENTS

| 9,338,055 B2 | 5/2016 | Edakkunni et al. |
| 9,696,982 B1 | 7/2017 | Michalik et al. |

(Continued)

FOREIGN PATENT DOCUMENTS

| CN | 107864098 A | 3/2018 |
| EP | 3041197 A1 | 7/2016 |
| WO | 2013184846 | 12/2013 |

OTHER PUBLICATIONS

Bjorklund, "Yang—A Data Modeling Language for the Network Configuration Protocol (NETCONF)," Internet Engineering Task Force (IETF), RFC 6020, Oct. 2010, 173 pp.

(Continued)

*Primary Examiner* — Viet D Vu
(74) *Attorney, Agent, or Firm* — Shumaker & Sieffert, P.A.

(57) ABSTRACT

Techniques are disclosed for identifying sets of network devices to which to deploy a software upgrade based on an importance to the network of each network device. For example, a network system obtains information identifying a number of instances of an application associated with network traffic forwarded by each network device of a plurality of network devices. The instances of the application are executed by client devices serviced by each network device in forwarding the network traffic. The network system assigns each network device to different upgrade groups based on the number of instances of the application, each upgrade group associated with a different relative priority. The network system deploys a software upgrade to each network device according to a priority of the respective upgrade group relative to a priority of the other upgrade groups.

20 Claims, 6 Drawing Sheets

(56) References Cited

U.S. PATENT DOCUMENTS

| | | | |
|---|---|---|---|
| 9,729,439 B2 | 8/2017 | MeLampy et al. | |
| 9,762,485 B2 | 9/2017 | Kaplan et al. | |
| 9,832,082 B2 | 11/2017 | Dade et al. | |
| 10,277,506 B2 | 4/2019 | Timmons et al. | |
| 10,534,601 B1 | 1/2020 | Venkata et al. | |
| 10,958,537 B2 | 3/2021 | Safavi | |
| 10,958,585 B2 | 3/2021 | Safavi | |
| 10,985,969 B2 | 4/2021 | Safavi | |
| 2012/0124570 A1* | 5/2012 | Alberth, Jr. | G06F 8/65 717/173 |
| 2012/0210310 A1* | 8/2012 | Cooley | G06F 8/65 717/168 |
| 2014/0053144 A1* | 2/2014 | Jose | G06F 8/65 717/168 |
| 2015/0124644 A1 | 5/2015 | Pani | |
| 2016/0135111 A1 | 5/2016 | Huang et al. | |
| 2017/0141968 A1 | 5/2017 | Lloyd et al. | |
| 2018/0331918 A1 | 11/2018 | Woodmansee et al. | |
| 2020/0044927 A1* | 2/2020 | Apostolopoulos | H04L 41/0895 |
| 2020/0159520 A1 | 5/2020 | Pande et al. | |
| 2020/0244704 A1* | 7/2020 | Andrews | G06F 8/65 |
| 2020/0310784 A1 | 10/2020 | Krishnan et al. | |
| 2022/0337495 A1 | 10/2022 | Safavi | |
| 2023/0008692 A1* | 1/2023 | Subramaniam | G06F 8/65 |

OTHER PUBLICATIONS

Cisco Systems, Inc., "Cisco SD-WAN Monitor and Maintain Configuration Guide", Jul. 19, 2019, p. 200.
CISCO Systems, Inc., "CISCO SD-WAN Software Upgrade Best practices", Sep. 14, 2020, p. 16.
Cisco, "Policies Configuration Guide for vEdge Routers, Cisco SD-WAN Release 20", Dec. 8, 2022, p. 8.
Draytek, "Monitoring Application Usage with VigorACS 3", Jun. 22, 2021, p. 6.
Enns, "NETCONF Configuration Protocol," Network Working Group, RFC 4741, Dec. 2006, 95 pp.
Juniper Networks, Inc., "Application Security User Guide for Security Devices", Junos OS, Sep. 12, 2022, p. 1162.
Juniper Networks, Inc., "Upgrading System Software for a Network Element", Tech Library, Dec. 11, 2016, p. 3.
Loren, "How to Schedule Your Updates to Happen Overnight", geekgir/tech, Oct. 3, 2022, p. 6.
Trommler, "How to properly announce scheduled network maintenance to your users", Paessler, Mar. 20, 2017, p. 10.
Extended Search Report from counterpart European Application No. 22217256.1 dated May 22, 2023, 8 pp.

* cited by examiner

US 12,058,000 B2

NETWORK DEVICE UPGRADE BASED GROUP PRIORITY

This application claims the benefit of Indian Provisional Application No. 202241038046, which was filed on Jul. 1, 2022, the entire content of which is incorporated herein by reference.

TECHNICAL FIELD

This disclosure generally relates to computer networking.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator can easily create and manage these high-level network configuration services.

SUMMARY

In general, the disclosure describes techniques for identifying sets of network devices to which to deploy a software upgrade based on the importance to the network of each of the network devices. For example, client devices execute one or more instances of one or more applications. These client-side applications generate and forward network traffic to network devices of a network for forwarding across the network.

A cloud-based Wide-Area Network (WAN) assurance system for the network obtains, for each network device of a plurality of network devices, information identifying characteristics of the network device, including, for example, a number of instances of an application associated with network traffic forwarded by the network device, e.g., over a previous time interval or at a given point in time. For example, each network device may identify, from the network traffic received from the client devices, the one or more instances of the one or more applications associated with the received network traffic. In some examples, each network device may use deep packet inspection (DPI) techniques to identify one or more applications associated with received packet flows and sends this information to the cloud-based WAN assurance system.

In some examples, the cloud-based WAN assurance system optionally computes, based at least in part on the number of instances of the application associated with the network traffic forwarded by each network device, an upgrade score for the respective network device. The upgrade score is indicative of the importance of the respective network device to delivery of the network traffic associated with the application due to the impact of various device-specific and network-specific characteristics. For example, a high upgrade score may indicate that the corresponding network device is relatively more important to the operability of the network, in that the network device may cause disruption to delivery of the network traffic associated with the application if it were to go offline to perform a software upgrade. Conversely, a low upgrade score may indicate that the corresponding network device is relatively less important to the operability of the network, in that the network device is less likely to cause disruption to delivery of the network traffic associated with the application if the network device were to go offline to perform a software upgrade.

The cloud-based WAN assurance system assigns the network devices into different upgrade groups, wherein each upgrade group includes as members one or more network devices of the plurality of network devices having upgrade scores within a predetermined range. In some examples, the cloud-based WAN assurance system assigns the network devices into different upgrade groups based on the upgrade score for each network device. The cloud-based WAN assurance system deploys, to the members of each upgrade group according to a priority of the upgrade group relative to the other upgrade groups of the plurality of upgrade groups, a software upgrade for installation.

The techniques of the disclosure may provide specific improvements to the computer-related field of computer networking and software upgrade management that have practical applications. For example, the techniques of the disclosure enable a network system to determine a number of instances of an application associated with network traffic forwarded by a network device, and assign the network device to a group based on the determined number of instances of the application. In some cases an upgrade score may be computed based on characteristics of network devices in a network, and the network system can first deploy (or allow a network administrator to first deploy) the software upgrade to a subset of the network devices having upgrade scores indicating low importance to the network. Once the software upgrade is validated, then the cloud-based WAN assurance system may deploy the software upgrade to other network devices having higher upgrade scores (e.g., having high importance to the network). Accordingly, the approach described herein may enable a network system to deploy software upgrades to groups of network devices based on their importance to the network, thereby reducing or mitigating the risk of disruptions to the operability of the network during installation of the software upgrade (e.g., due to network device downtime) or after completing the software upgrade (e.g., due to unforeseen errors with the software upgrade). In some examples, the network system may determine a number of instances of an application associated with network traffic forwarded by a network device, and assign the network device to a group based on the determined number of instances of the application.

In one example, this disclosure describes a method comprising: obtaining, by a network system, information identifying a number of instances of an application associated with network traffic forwarded by a network device of a plurality of network devices of a network, wherein the instances of the application are executed by client devices serviced by the network device in forwarding the network traffic; assigning, by the network system and based on the number of instances of the application, the network device to a first upgrade group of a plurality of upgrade groups, wherein each of the plurality of upgrade groups is associated with a different relative priority; and deploying, by the network system and to the network device according to a priority of the first upgrade group relative to a priority of other upgrade groups of the plurality of upgrade groups, a software upgrade.

In another example, this disclosure describes a network system comprising processing circuitry configured to: obtain information identifying a number of instances of an application associated with network traffic forwarded by a network device of a plurality of network devices of a network, wherein the instances of the application are executed by client devices serviced by the network device in forwarding the network traffic; assign, based on the number of instances of the application, the network device to a first upgrade group of a plurality of upgrade groups, wherein each of the plurality of upgrade groups is associated with a different relative priority; and deploy, to the network device according to a priority of the first upgrade group relative to a priority of other upgrade groups of the plurality of upgrade groups, a software upgrade.

In another example, this disclosure describes a non-transitory, computer-readable medium comprising instructions that, when executed, are configured to cause processing circuitry of a network system to: obtain information identifying a number of instances of an application associated with network traffic forwarded by a network device of a plurality of network devices of a network, wherein the instances of the application are executed by client devices serviced by the network device in forwarding the network traffic; assign, based on the number of instances of the application, the network device to a first upgrade group of a plurality of upgrade groups, wherein each of the plurality of upgrade groups is associated with a different relative priority; and deploy, to the network device according to a priority of the first upgrade group relative to a priority of other upgrade groups of the plurality of upgrade groups, a software upgrade.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
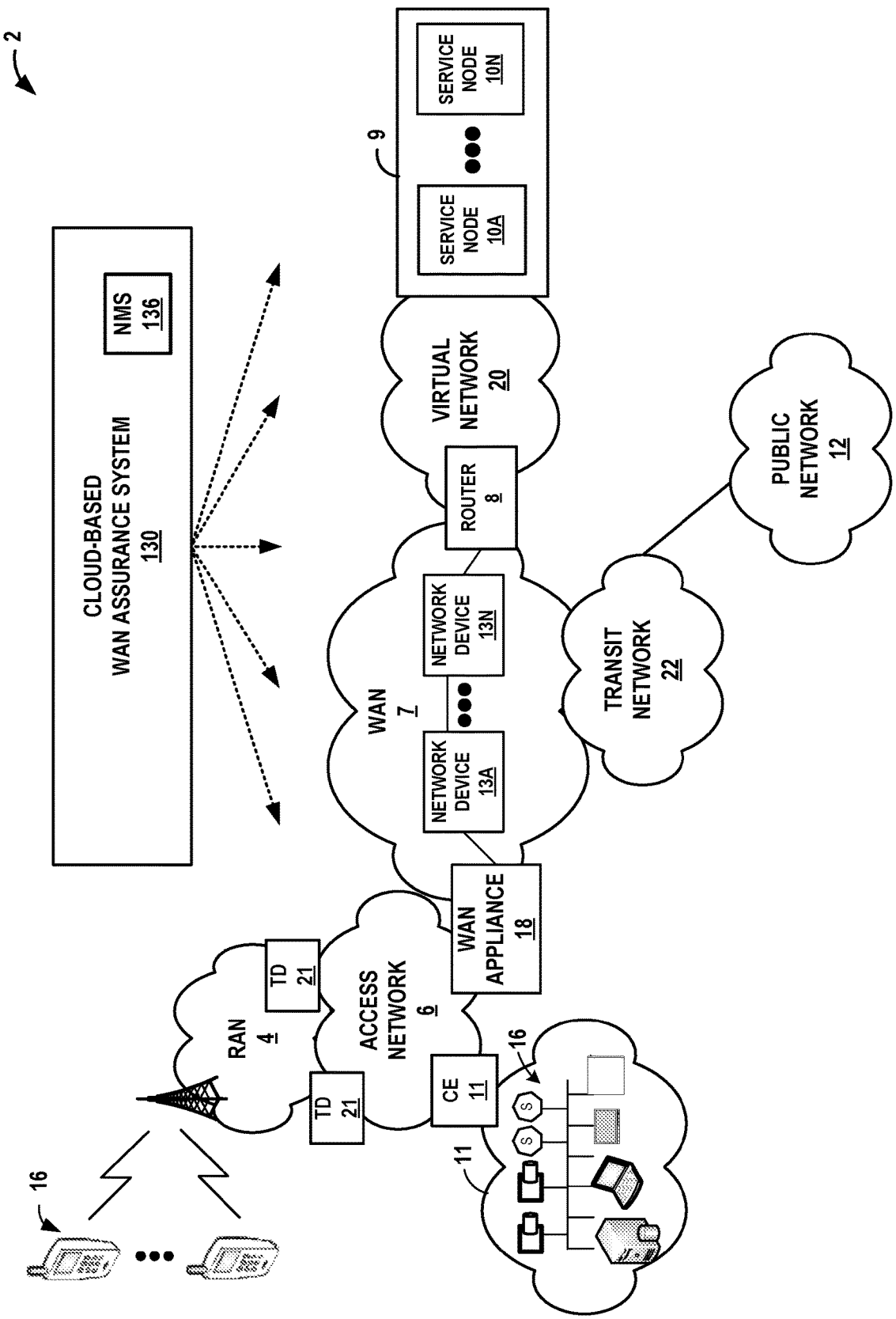
FIG. 1 is a block diagram of an example network system for identifying sets of network devices to which to deploy a software upgrade in accordance with the techniques of the disclosure.

In general, the disclosure describes techniques for identifying sets of network devices to which to deploy a software upgrade based on the importance to the network of each of the network devices. Deploying a software upgrade to a network device can be a disrupting operation. A network operator should schedule the software upgrade at a time when user impact is low. Typically, upgrades are done either automatically or on a group level (e.g., org-level or site-level) to reduce the administrative burden on the network administrator. However, an upgrade error may lead to a network outage, which may have serious business and financial impact. Conventional upgrade schemes use an all-at-once approach, a serial approach, or a "canary" upgrade that randomly selects a sample group of devices with which to test deployment of the software upgrade. However, such conventional upgrade schemes do not consider the importance or user real time usage of a network device.

As described herein, techniques are disclosed for a device upgrade scheme based on an importance to the network of each network device. In some examples, a network system may evaluate the importance of a network device to the network by computing an upgrade score for the network device based on multiple criteria related to a role, operation, configuration, and performance of the network device within the network. The optional upgrade score may provide a metric indicative of how important a particular network device is to customer operation. For example, an unhealthy network device or a network device with unimportant applications running may be a good choice for first deployment of a software upgrade. In contrast, the customer operation may be better served by deploying the software upgrade to a network device that is successfully transmitting data at a later time. In some examples, a "low" upgrade score may indicate that a network device has low importance to delivery of network traffic of a customer. In other examples, a "high" upgrade score may instead be used to indicate that a network device has low importance to delivery of network traffic of a customer.

In one example of the techniques disclosed herein, a network management system may obtain information identifying a number of instances of an application associated with network traffic forwarded by a network device. In some examples, the network management system may optionally determine an upgrade score for the network device that is based on the number of instances of the application associated with network traffic forwarded by the network device. In some examples, the upgrade score may be further derived from a historical pattern of network devices using machine learning applied to numerous characteristics or factors, including but not limited to: a number of user active applications present within network traffic forwarded by a network device; a health of the network device; an upgrade priority of the network device (which optionally may be statically configured by an administrator or dynamically detected based on a type of application running); a number of peer paths with which the network device is configured; a role of the network device within the network (e.g., hub, spoke, or mesh); or a high availability of one or more interfaces of the network device.

As an example, a hub router may have high importance to delivery of network traffic for a customer, and hence may be assigned an upgrade score of 100. Similarly, other routers may have greater or lesser upgrade scores indicative of an importance of the respective network device to delivery of network traffic due to the impact of various device-specific and network-specific characteristics. When a set of network devices are due for a software upgrade, a subset of devices having a lowest importance to the network (e.g., as may be indicated by a "lowest" upgrade score) may be upgraded first. Then, a set of devices having a next lowest importance (e.g., as may be indicated by a "next lowest" upgrade score) are selected, and so on. This may ensure that the cloud-based WAN assurance system may upgrade network devices with increasing importance, to thereby reduce service and network downtime.

In some examples, this approach may be combined with a "canary" upgrade approach to select a prioritized list of network devices for testing deployment of the software upgrade. For example, a subset of devices having a lowest importance to the network (e.g., as may be indicated by a "lowest" upgrade score) may be upgraded first to test for problems created by the software upgrade, thereby exposing only the least important network devices to potential downtime (and avoiding deployment of the software upgrade to the most important network devices until the software update is validated). In this fashion, the techniques of the disclosure may be used to reduce the risk of service and network downtime when deploying a software upgrade to network devices.

FIG. 1 is a block diagram of an example network system 2 for identifying sets of network devices to which to deploy a software upgrade in accordance with the techniques of the disclosure. In the illustrated example of FIG. 1, a service provider network 2 operates as a private network to provide packet-based network services to subscriber devices 16 (also referred to herein as "client devices 16"). That is, service provider network 2 provides authentication and establishment of network access for subscriber devices 16 such that a subscriber device may begin exchanging data packets with public network 12, which may be an internal or external packet-based network such as the Internet.

Service provider network 2 comprises access network 6 that provides connectivity to public network 12 via service provider software-defined wide area network 7 (hereinafter, "SD-WAN 7") and router 8. SD-WAN 7 and public network 12 provide packet-based services that are available for request and use by subscriber devices 16. As examples, SD-WAN 7 and/or public network 12 may provide bulk data delivery, voice over Internet protocol (VoTP), Internet Protocol television (IPTV), Short Messaging Service (SMS), Wireless Application Protocol (WAP) service, or customer-specific application services. Public network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various examples, public network 12 is connected to a public WAN, the Internet, or to other networks. Public network 12 executes one or more packet data protocols (PDPs), such as IP (IPv4 and/or IPv6), X.25 or Point-to-Point Protocol (PPP), to enable packet-based transport of public network 12 services.

In general, subscriber devices 16 connect to gateway router 8 via access network 6 to receive connectivity to subscriber services for applications hosted by public network 12 or data center 9. A subscriber may represent, for instance, an enterprise, a residential subscriber, or a mobile subscriber. Subscriber devices 16 may be, for example, personal computers, laptop computers or other types of computing devices positioned behind customer equipment (CE) 11, which may provide local routing and switching functions. Each of subscriber devices 16 may run a variety of software applications, such as word processing and other office support software, web browsing software, software to support voice calls, video games, video conferencing, and email, among others. For example, subscriber device 16 may be a variety of network-enabled devices, referred generally to as "Internet-of-Things" (IoT) devices, such as cameras, sensors (S), televisions, appliances, etc. In addition, subscriber devices 16 may comprise mobile devices that access the data services of service provider network 2 via a radio access network (RAN) 4. Example mobile subscriber devices include mobile telephones, laptop or desktop computers having, e.g., a 3G wireless card, wireless-capable netbooks, video game devices, pagers, smart phones, personal data assistants (PDAs) or the like.

A network service provider operates, or in some cases leases, elements of access network 6 to provide packet transport between subscriber devices 16 and router 8. Access network 6 represents a network that aggregates data traffic from one or more of subscriber devices 16 for transport to/from SD-WAN 7 of the service provider. Access network 6 includes network nodes that execute communication protocols to transport control and user data to facilitate communication between subscriber devices 16 and router 8. Access network 6 may include a broadband access network, a wireless LAN, a public switched telephone network (PSTN), a customer premises equipment (CPE) network, or other type of access network, and may include or otherwise provide connectivity for cellular access networks, such as radio access network (RAN) 4. Examples include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the WiMAX forum.

An SD-WAN appliance 18 may be a customer edge (CE) router, a provider edge (PE) router, or other network device between access network 6 and SD-WAN 7. SD-WAN 7 offers packet-based connectivity to subscriber devices 16 attached to access network 6 for accessing public network 12 (e.g., the Internet). SD-WAN 7 may represent a public network that is owned and operated by a service provider to interconnect a plurality of networks, which may include access network 6. In some examples, SD-WAN 7 may implement Multi-Protocol Label Switching (MPLS) forwarding and in such instances may be referred to as an MPLS network or MPLS backbone. In some instances, SD-WAN 7 represents a plurality of interconnected autonomous systems, such as the Internet, that offers services from one or more service providers. SD-WAN 7 may include network devices 13A-13N (hereinafter, "network devices 13"), including SD-WAN appliance 18 and router 8, that forward application traffic on WAN links within SD-WAN 7. Public network 12 may represent the Internet. Public network 12 may represent an edge network coupled to SD-WAN 7 via a transit network 22 and one or more network devices, e.g., a customer edge device such as customer edge switch or router. Public network 12 may include a data center. SD-WAN appliance 8 may exchange packets with service nodes 10A-ION (hereinafter, "service nodes 10") via virtual network 20, and router 8 may forward packets to public network 12 via transit network 22.

In examples of network 2 that include a wireline/broadband access network, router 8 may represent a Broadband Network Gateway (BNG), Broadband Remote Access Server (BRAS), MPLS PE router, core router or gateway, or Cable Modem Tenination System (CMTS). In examples of network 2 that include a cellular access network as access network 6, router 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to router 8 may be implemented in a switch, service card or another network element or component. In some examples, router 8 may itself be a service node.

A network service provider that administers at least parts of network 2 typically offers services to subscribers associated with devices, e.g., subscriber devices 16, that access service provider network 2. Services offered may include, for example, traditional Internet access, VoIP, video and multimedia services, and security services. As described above with respect to SD-WAN 7, SD-WAN 7 may support multiple types of access network infrastructures that connect to service provider network access gateways to provide access to the offered services. In some instances, the network system may include subscriber devices 16 that attach to multiple different access networks 6 having varying architectures.

In general, any one or more of subscriber devices 16 may request authorization and data services by sending a session request to a gateway device such as SD-WAN appliance 18 or router 8. In turn, SD-WAN appliance 18 may access a central server (not shown) such as an Authentication, Authorization and Accounting (AAA) server to authenticate the one of subscriber devices 16 requesting network access. Once authenticated, any of subscriber devices 16 may send subscriber data traffic toward SD-WAN 7 to access and receive services provided by public network 12, and such packets may traverse router 8 as part of at least one packet flow. In some examples, SD-WAN appliance 18 may forward all authenticated subscriber traffic to public network 12, and router 8 may apply services and/or steer particular subscriber traffic to a data center 9 if the subscriber traffic requires services on service nodes 10. Applications (e.g., service applications) to be applied to the subscriber traffic may be hosted on service nodes 10.

For example, when forwarding subscriber traffic, router 8 may direct individual subscriber packet flows through services executing on one or more service cards installed within data center 9. In addition, or alternatively, service provider network 2 includes a data center 9 having a cluster of service nodes 10 that provide an execution environment for the mostly virtualized network services. In some examples, each of service nodes 10 represents a service instance. Each of service nodes 10 may apply one or more services to traffic flows. As such, router 8 may steer subscriber packet flows through defined sets of services provided by service nodes 10. That is, in some examples, each subscriber packet flow may be forwarded through a particular ordered combination of services provided by service nodes 10, each ordered set being referred to herein as a "service chain." As examples, services and/or service nodes 10 may apply stateful firewall (SFW) and security services, DPI, carrier grade network address translation (CGNAT), traffic destination function (TDF) services, media (voice/video) optimization, Internet Protocol security (IPSec)/virtual private network (VPN) services, hypertext transfer protocol (HTTP) filtering, counting, accounting, charging, and/or load balancing of packet flows, or other types of services applied to network traffic.

In the example of FIG. 1, subscriber packet flows may be directed along a service chain that includes any of services applied by service nodes 10. Once processed at a terminal node of the service chain, i.e., the last service to be applied to packets flowing along a particular service path, the traffic may be directed to public network 12.

Whereas a "service chain" defines one or more services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. Each service chain may be associated with a respective service tunnel, and packet flows associated with each subscriber device 16 flow along service tunnels in accordance with a service profile associated with the respective subscriber. For example, a given subscriber may be associated with a particular service profile, which in turn is mapped to a service tunnel associated with a particular service chain. Similarly, another subscriber may be associated with a different service profile, which in turn is mapped to a service tunnel associated with a different service chain. In some examples, after SD-WAN appliance 18 has authenticated and established access sessions for the subscribers, SD-WAN appliance 18 or router 8 may direct packet flows for the subscribers along the appropriate service tunnels, thereby causing data center 9 to apply the requisite ordered services for the given subscriber. In some examples, a centralized controller (not shown) for the software-defined network (e.g., an SDN controller) may also provide a forwarding rule set to SD-WAN appliance 18 or router 8 for managing the forwarding path. In some examples, the SDN controller manages the forwarding path through all elements in data center 9 starting at router 8.

In some examples, service nodes 10 may implement service chains using internally configured forwarding state that directs packets of the packet flow along the service chains for processing according to the identified set of service nodes 10. Such forwarding state may specify tunnel interfaces for tunneling between service nodes 10 using network tunnels such as IP or Generic Route Encapsulation (GRE) tunnels, Network Virtualization using GRE (NVGRE), or by using VLANs, Virtual Extensible LANs (VXLANs), MPLS techniques, and so forth. In some cases, real or virtual switches, routers or other network elements that interconnect service nodes 10 may be configured to direct the packet flow to the service nodes 10 according to service chains.

In the example of FIG. 1, service provider network 2 comprises a software defined network (SDN) and network functions virtualization (NFV) architecture. An SDN controller (not shown in FIG. 1) may provide a high-level controller device for configuring and managing the routing and switching infrastructure of service provider network 2. NFV orchestrator device (not shown in FIG. 1) may provide a high-level orchestrator for configuring and managing virtualization of network services into service nodes 10 of data center 9. In some instances, the SDN controller manages deployment of virtual machines (VMs) within the operating environment of data center 9. For example, the SDN controller may interact with provider edge (PE) router 8 to specify service chain information. For example, the service chain information provided by the SDN controller may specify any combination and ordering of services provided by service nodes 10, traffic engineering information for tunneling or otherwise transporting packet flows along service paths, rate limits, Type of Service (TOS) markings or packet classifiers that specify criteria for matching packet flows to a particular service chain. Further example details of an SDN controller are described in PCT International Patent Application PCT/US2013/044378, filed Jun. 5, 2013, the entire content of which is incorporated herein by reference.

Although illustrated as part of data center 9, service nodes 10 may be network devices coupled by one or more switches or virtual switches of SD-WAN 7. In one example, each of service nodes 10 may run as VMs in a virtual compute environment. Moreover, the compute environment may comprise a scalable cluster of general computing devices, such as x86 processor-based servers. As another example, service nodes 10 may comprise a combination of general purpose computing devices and special purpose appliances. As virtualized network services, individual network services provided by service nodes 10 can scale just as in a modern data center through the allocation of virtualized memory, processor utilization, storage and network policies, as well as horizontally by adding additional load-balanced VMs. In other examples, service nodes 10 may be gateway devices or other routers. In further examples, the functionality described with respect to each of service nodes 10 may be implemented in a switch, service card, or another network element or component.

Cloud-based WAN assurance system 130 provides WAN assurance services to SD-WAN 7. In some examples, cloud-based WAN assurance system 130 provides monitoring and analytics for network devices 13. Cloud-based WAN assurance system 130 includes network management system (NMS) 136 which may provide machine-learning based analytics of data collected by cloud-based WAN assurance system 130.

In accordance with the techniques described herein, cloud-based WAN assurance system 130 identifies sets of network devices 13 to which to deploy a software upgrade based on the importance to SD-WAN 7 of each of network devices 13. For example, client devices 16 execute one or more instances of one or more applications. These client-side applications generate and forward network traffic to network devices 13 for forwarding across SD-WAN 7 to service nodes 10. Cloud-based WAN assurance system 130 obtains, for each network device 13, information identifying the number of instances of an application associated with network traffic forwarded by the network device 13.

In some examples, each network device 13 uses DPI techniques to identify an application associated with received network traffic. For example, a network device 13 may perform DPI on a packet of a received packet flow (e.g., a first packet, or a subset of one or more packets, or one or more sample or representative packets of the plurality of packets of the packet flow) to determine that the packet flow is associated with an instance of a particular type of application. The network device 13 may perform DPI on each packet flow serviced by the network device 13 so as to determine a number of instances of each type of application for which the network device 13 services traffic. Network device 13A sends this information to cloud-based WAN assurance system 130, e.g., for each unique packet flow or session.

In some examples, network devices 13 are session-smart routers that perform session-based routing of network traffic received from subscriber devices 16. Additional description with respect to session-based routing is set forth in U.S. Pat. No. 9,762,485, entitled "NETWORK PACKET FLOW CONTROLLER WITH EXTENDED SESSION MANAGEMENT," issued on Sep. 12, 2017; U.S. Pat. No. 10,277, 506, entitled "STATEFUL LOAD BALANCING IN A STATELESS NETWORK," issued on Apr. 30, 2019; and U.S. Pat. No. 9,729,439, entitled "NETWORK PACKET FLOW CONTROLLER," issued on Aug. 8, 2017, the entire contents of each of which are incorporated by reference herein.

In some examples, a network device 13 forwards one or more sampled packets for each flow serviced by network device 13 to one or more traffic collectors (not depicted in FIG. 1) and/or cloud-based WAN assurance system 130. In such an example, cloud-based WAN assurance system 130 performs DPI on the one or more sampled packets of each packet flow serviced by each of network devices 13 to determine a type of application associated with the packet flow. Cloud-based WAN assurance system 130 may thereafter determine a number of instances of each type of application that is serviced by each network device 13.

As described herein, a network device 13 may be considered more or less important (e.g., critical) to delivery of the network traffic associated with the application due to the impact of various device-specific and network-specific characteristics. For example, a network device 13 that services a large number of instances of an application executed by client devices 16 may be more important to servicing network traffic of client devices 16 than a network device 13 that services a single instance (or no instances) of the same application. As other examples, a health of the network device 13 or an upgrade priority of the network device may indicate that the network device may have more impact on servicing network traffic of client devices 16. As further examples, a number of peer paths with which the network device 13 is provisioned, a role of the network device 13 within SD-WAN 7 (e.g., a hub, spoke, or mesh role within SD-WAN 7), or a high availability of one or more interfaces of the network device 13, may indicate a severity of disruption to servicing the network traffic of client devices 16 if the network device 13 were to be offline for a software upgrade.

In some examples, NMS 136 of cloud-based WAN assurance system 130 optionally computes, based at least in part on the number of instances of the application associated with the network traffic forwarded by each network device 13, an upgrade score for the respective network device 13. The upgrade score is indicative of the importance of the respective network device 13 to delivery of the network traffic associated with the application due to the impact of various device-specific and network-specific characteristics. For example, a high upgrade score may indicate that a particular network device 13 has greater importance (e.g., greater importance) to the operability of SD-WAN 7, such that the network device 13 may cause disruption to delivery of the network traffic associated with the application if it were to go offline to perform a software upgrade. Conversely, a low upgrade score may indicate that a particular network device 13 has lesser importance (e.g., lesser importance) to the operability of SD-WAN 7, such that the network device 13 may not cause disruption to delivery of the network traffic associated with the application if the network device 13 were to go offline to perform a software upgrade.

NMS 136 assigns, based on the upgrade score for each network device 13, network devices 13 into different upgrade groups. Each upgrade group includes, as members, one or more network devices 13 having upgrade scores within a predetermined range. NMS 136 deploys, to the members of each upgrade group according to a priority of the upgrade group relative to the other upgrade groups of the plurality of upgrade groups, a software upgrade for installation.

For example, members of a first upgrade group that have a lesser upgrade score may be indicative of the members having a lesser importance to delivery of the network traffic associated with the application due to the impact of various device-specific and network-specific characteristics. In contrast, members of a second upgrade group that have a greater upgrade score may be indicative of the members having a greater importance to delivery of the network traffic associated with the application. Therefore, NMS 136 deploys, to the members of the first upgrade group, the software upgrade prior to deploying the software upgrade to the members of the second upgrade group such that NMS 136 may deploy the software upgrade to less important network devices 13 of SD-WAN 7 prior to deploying the software upgrade to more important network devices 13 of SD-WAN 7. In this fashion, cloud-based WAN assurance system 130 may "test" the software upgrade for problems using unimportant or relatively less important devices in a manner that exposes SD-WAN 7 to the least amount of potential service disruption, and only deploy the software upgrade to important devices once the software upgrade has been vetted for proper operability.

Figure 2:
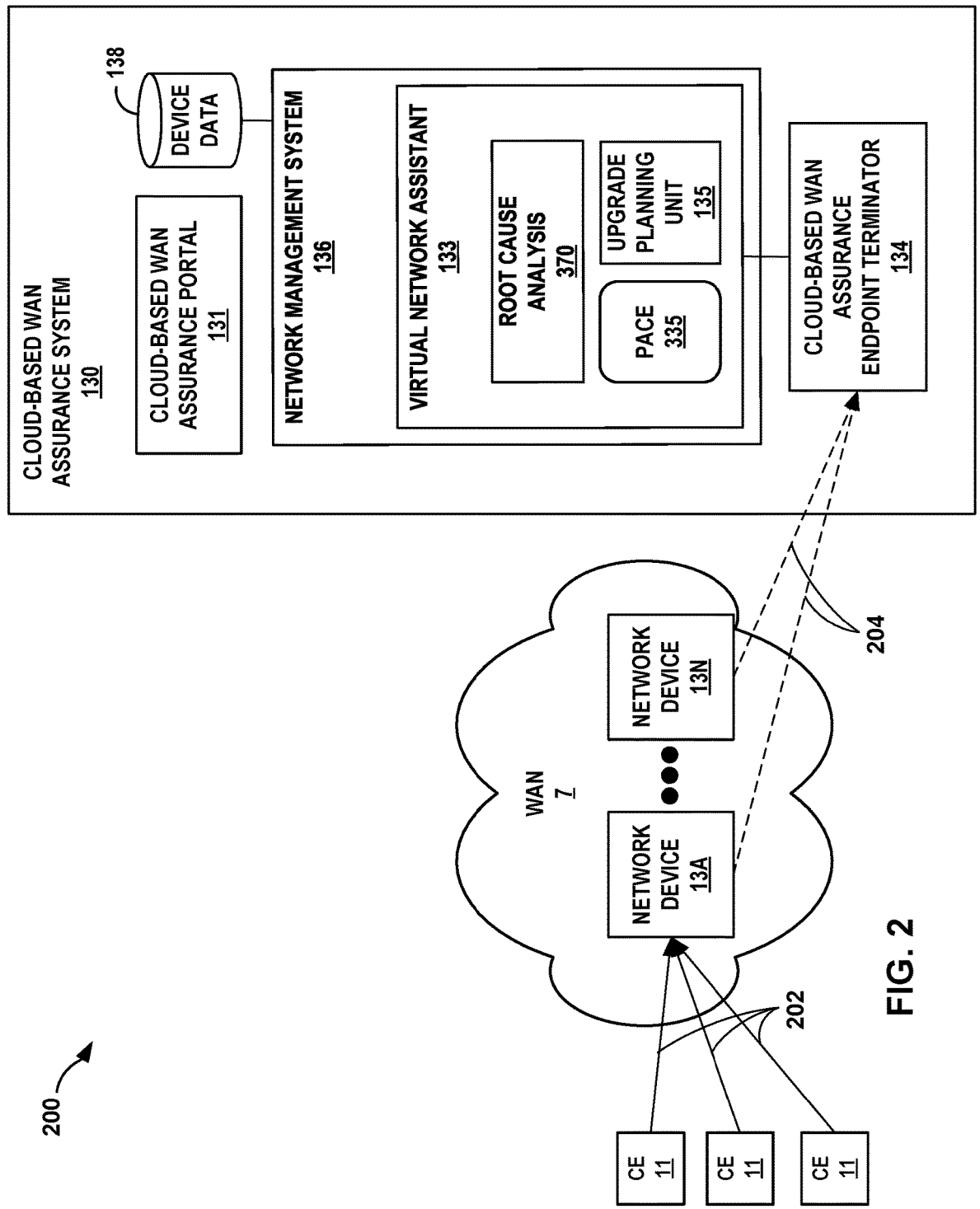
FIG. 2 is a block diagram illustrating an example computer network system configured to identify sets of network devices to which to deploy a software upgrade, in accordance with the techniques of the disclosure.

FIG. 2 is a block diagram illustrating example computer network computer network system 200 configured to identify sets of network devices 13 to which to deploy a software upgrade based on an importance to SD-WAN 7 of each network device 13, in accordance with the techniques of the disclosure. Cloud-based WAN assurance system 130 is a cloud-based microservices system. In some examples, each of network devices 13 is an example of one of network devices 13 of FIG. 1 and cloud-based WAN assurance system 130 is an example of cloud-based WAN assurance system 130 of FIG. 1.

Cloud-based WAN assurance system 130 provides a cloud service that brings automated operations and service levels to the enterprise access layer for the WAN edge, and when used in conjunction with Wired and Wireless Assurance, transforms all operations covering the switches, IoT devices, access points, servers, printers, etc. Gateways (e.g., including network devices 13) provide rich streaming telemetry data that enable the insights for gateway health metrics and anomaly detection. Network devices 13 provide streaming data to cloud-based WAN assurance system 130, which may include telemetry data, SLE metrics, and/or traffic metrics including application usage data, and health information, etc.

In some examples, the streamed data includes data relating to application response times and WAN link and gateway health measurements. Cloud-based WAN assurance system 130 may determine gateway health (as an example of network device health) based on a number of factors, including, for example, CPU utilization, memory utilization, link utilization, temperature, fan, or power. Cloud-based WAN assurance system 130 may determine WAN link health based on a number of factors, including, for example, IPSec information, Routing Protocols information, and WAN interface information. Cloud-based WAN assurance system 130 may determine an application experience and/or application health based on a number of factors, including, for example, latency, jitter, packet loss, roundtrip times, and other metrics, on a per-application basis.

WAN insights driven by AI: For physical network devices, the WAN insights show exactly how network devices are performing with detailed network device metrics and insights down to the port level such as CPU, memory utilization, bytes transferred, traffic utilization, and power draw. WAN Assurance also logs network device events, like configuration changes and system alerts. Along with WAN utilization, IPSec utilization insights and Secure Vector Routing (SVR) utilization insights can help understand the amount of traffic sent over IPSec tunnels versus local breakout, where IPSec tunnels or SVR session-based routing are in use, respectively. WAN insights also provide application visibility on a per user as well as per app basis. In combination with the tenant information and session-aware router capabilities described above, WAN insights can provide application visibility on a per tenant, per application basis.

In operation, NMS 136 observes, collects and/or receives event data, which may take the form of data extracted from messages, counters and statistics, for example. NMS 136 may comprise one or more computing devices, dedicated servers, virtual machines, containers, services or other forms of environments for performing the techniques described herein. Similarly, computational resources and components implementing virtual network assistant (VNA) 133 and proactive analytics and correlations engine (PACE) 135 may be part of the NMS 136, may execute on other servers or execution environments, or may be distributed to nodes within a network (e.g., routers, switches, controllers, gateways and the like).

To ensure a high Service Level Experience (SLE), NMS 136 employs methods to detect faults in real-time and to even predictively detect faults before a user notices the fault(s). These methods may also be used for ensuring a particular level of application quality of experience (AppQoE).

Example fault detection systems having aspects that may be employed by NMS 136 are described in U.S. Pat. No. 10,958,585, entitled "METHODS AND APPARATUS FOR FACILITATING FAULT DETECTION AND/OR PREDICTIVE FAULT DETECTION," issued on Mar. 23, 2021; U.S. Pat. No. 9,832,082, entitled "MONITORING WIRELESS ACCESS POINT EVENTS," issued on Nov. 28, 2017; U.S. Pat. No. 10,958,537, entitled "METHOD FOR SPATIO-TEMPORAL MONITORING," issued on Mar. 23, 2021; and U.S. Pat. No. 10,985,969, entitled "SYSTEMS AND METHODS FOR A VIRTUAL NETWORK ASSISTANT," issued on Apr. 20, 2021, the entire contents of each of which are incorporated by reference herein.

In some examples, VNA 133 of NMS 136 may apply machine learning techniques to identify the root cause of error conditions detected or predicted from the streams of event data. If the root cause may be automatically resolved, VNA 133 invokes one or more corrective actions to correct the root cause of the error condition, thus automatically improving the underlying SLE metrics and also automatically improving the user experience. Further example details of root cause analysis and automatic correction techniques that may be performed by NMS 136 are described in U.S. patent application Ser. No. 17/303,222, entitled "VIRTUAL NETWORK ASSISTANT HAVING PROACTIVE ANALYTICS AND CORRELATION ENGINE USING UNSUPERVISED ML MODEL," filed May 24, 2021, the entire contents of which are incorporated by reference herein.

Although the techniques of the present disclosure are described in this example as performed by NMS 136 of cloud-based WAN assurance system 130, techniques described herein may be performed by any other computing device(s), system(s), and/or server(s), including for purposes other than WAN assurance, and this disclosure is not limited in this respect. For example, one or more computing device(s) configured to execute the functionality of the techniques of this disclosure may reside in a dedicated server or be included in any other server in addition to or other than cloud-based WAN assurance system 130, or may be distributed throughout network system 200, and may or may not form a part of cloud-based WAN assurance system 130.

In some examples, network devices 13 (e.g., routers or switches) or even access points (not shown) may be configured to locally construct, train, apply and retrain unsupervised ML model(s) based on locally collected SLE metrics to determine whether the collected network event data should be discarded or whether the data represents anomalous behavior that needs to be forwarded to NMS 136 for further root cause analysis by a virtual network assistant (FIG. 2) to facilitate identification and resolution of faults.

In accordance with the techniques described herein, cloud-based WAN assurance system 130 identifies sets of network devices 13 to which to deploy a software upgrade based on the importance to SD-WAN 7 of each of network devices 13. For example, client devices 16 of FIG. 1 execute one or more instances of one or more applications. Such applications may include a Voice over Internet Protocol (VoIP), a video streaming application, an email application, a gaming application, a network management application, a cloud-based word processing application, or an enterprise application, etc. These client-side applications generate and forward network traffic 202 to network devices 13 for forwarding across SD-WAN 7 to service nodes 10.

In some examples, each network device 13 uses deep packet inspection techniques to identify an application associated with received network traffic. For example, network device 13A receives network traffic 202 from client devices 16 and identifies the network traffic as associated with two instances of a video streaming application and one instance of an email application. Network device 13A sends this information to cloud-based WAN assurance system 130. Cloud-based WAN assurance system 130 obtains, for each network device 13, information identifying a number of instances of an application associated with network traffic 202 forwarded by the network device 13.

VNA 133 of NMS 136 includes upgrade planning unit 135. In some examples, upgrade planning unit 135 optionally computes, based at least in part on the number of instances of the application associated with the network traffic forwarded by each network device 13, an upgrade score for the respective network device 13. The upgrade score is indicative of the importance of the respective network device 13 to delivery of the network traffic associated with the application due to the impact of various device-specific and network-specific characteristics. For example, a high upgrade score may indicate that a particular network device 13 has greater importance (e.g., greater importance) to the operability of SD-WAN 7, such that the network device 13 may cause disruption to delivery of the network traffic associated with the application if it were to go offline to perform a software upgrade. Conversely, a low upgrade score may indicate that a particular network device 13 has lesser importance (e.g., lesser importance) to the operability of SD-WAN 7, such that the network device 13 may not cause disruption to delivery of the network traffic associated with the application if the network device 13 were to go offline to perform a software upgrade.

In some examples, upgrade planning unit 135 may compute the upgrade score for each network device 13 based on other characteristics or factors in addition to or in the alternative to the number of instances of the application associated with the network traffic forwarded by each network device 13. For example, upgrade planning unit 135 may compute the upgrade score for each network device 13 based at least in part on the number of instances of the application associated with the network traffic forwarded by each network device 13, a health of the network device 13, an upgrade priority of the network device 13, a number of peer paths with which the network device 13 is provisioned, a role of the network device 13 within SD-WAN 7 (e.g., a hub, spoke, or mesh role within SD-WAN 7), or a high availability of one or more interfaces of the network device 13, separately or in any combination. In some examples, an administrator may statically configure an upgrade priority of a network device 13. In other examples, an administrator may assign upgrade priorities to different applications, and upgrade planning unit 135 may dynamically determine an upgrade priority of a particular network device 13 based on the type of application(s) associated with network traffic serviced by the network device. In examples where upgrade planning unit 135 uses two or more characteristics to compute the upgrade score, upgrade planning unit 135 may average each individual characteristic to obtain the upgrade score, or alternatively weight each characteristic to obtain the upgrade score to affect a contribution of each respective characteristic to the overall upgrade score. In some examples, upgrade planning unit 135 applies machine learning to generate the weights of each characteristic used in computing the upgrade score.

For example, upgrade planning unit 135 may compute the upgrade score additionally based at least in part on a health of a network device 13. In this example, a network device 13 with relatively worse health is given a more prioritized upgrade score than a network device 13 having relatively better health. In this fashion, upgrade planning unit 135 performs the software upgrade on the network device 13 with relatively worse health prior to performing the software upgrade on the network device 13 with relatively better health.

As another example, upgrade planning unit 135 may compute the upgrade score additionally based at least in part on an upgrade priority of a network device 13. In this example, a network device 13 with a relatively higher upgrade priority is given a more prioritized upgrade score than a network device 13 having a relatively lower upgrade priority. In this fashion, upgrade planning unit 135 performs the software upgrade on the network device 13 with the relatively higher upgrade priority prior to performing the software upgrade on the network device 13 with the relatively lower upgrade priority.

As another example, upgrade planning unit 135 may compute the upgrade score additionally based at least in part on an upgrade priority of a network device 13. In this example, a network device 13 with a relatively higher upgrade priority is given a more prioritized upgrade score than a network device 13 having a relatively lower upgrade priority. In this fashion, upgrade planning unit 135 performs the software upgrade on the network device 13 with the relatively higher upgrade priority prior to performing the software upgrade on the network device 13 with the relatively lower upgrade priority.

As another example, upgrade planning unit 135 may compute the upgrade score additionally based at least in part on a number of peer paths with which a network device 13 is provisioned. In this example, a network device 13 provisioned with a relatively fewer number of peer paths is given a more prioritized upgrade score than a network device 13 provisioned with a relatively greater number of peer paths. In this fashion, upgrade planning unit 135 performs the software upgrade on the network device 13 provisioned with the relatively fewer number of peer paths prior to performing the software upgrade on the network device 13 with the relatively lower upgrade priority.

As another example, upgrade planning unit 135 may compute the upgrade score additionally based at least in part on a high availability status of one or more interfaces of network device 13. In this example, a network device 13 having a high availability status of one or more interfaces is given a more prioritized upgrade score than a network device 13 not having a high availability status of one or more interfaces. In this fashion, upgrade planning unit 135 performs the software upgrade on the network device 13 having a high availability status of one or more interfaces prior to performing the software upgrade on the network device 13 not having a high availability status of one or more interfaces.

As another example, upgrade planning unit 135 may compute the upgrade score additionally based at least in part on a role of a plurality of roles assigned to network device 13. In this example, upgrade planning unit 135 applies predefined rules indicating a manner in which each role of the plurality of roles is prioritized for upgrade. In some examples, the role may include one of a hub, spoke, or mesh role within the network. In some examples, upgrade planning unit 135 performs the software upgrade on a network device 13 having a spoke role prior to performing the software upgrade on a network device 13 having a hub role.

Upgrade planning unit 135 assigns, based on the upgrade score for each network device 13, network devices 13 into different upgrade groups. Each upgrade group includes, as members, one or more network devices 13 having upgrade scores within a predetermined range. The possible range of upgrade scores, the number of upgrade groups, and the specific values of an upgrade score assigned to each upgrade group may be selected by an administrator.

As an example using 4 upgrade groups and an arbitrary upgrade score that may assigned between 0 and 100, upgrade planning unit 135 organizes first network devices 13 having upgrade scores between 0-25 into a first upgrade group, second network devices 13 having upgrade scores between 26-50 into a second upgrade group, third network devices 13 having upgrade scores between 51-75 into a third upgrade group, and fourth network devices 13 having upgrade scores between 76-100 into a fourth upgrade group.

As another example using 3 upgrade groups and an arbitrary upgrade score that may assigned between 0 and 10, upgrade planning unit 135 organizes first network devices 13 having upgrade scores between 0-3 into a first upgrade group, second network devices 13 having upgrade scores between 4-6 into a second upgrade group, and third network devices 13 having upgrade scores between 7-10 into a third upgrade group.

Upgrade planning unit 135 deploys, to the members of each upgrade group according to a priority of the upgrade group relative to the other upgrade groups of the plurality of upgrade groups, a software upgrade for installation. For example, members of a first upgrade group that have a lesser upgrade score may be indicative of the members having a lesser importance to delivery of the network traffic associated with the application due to the impact of various device-specific and network-specific characteristics. In contrast, members of a second upgrade group that have a greater upgrade score may be indicative of the members having a greater importance to delivery of the network traffic associated with the application. Therefore, upgrade planning unit 135 deploys, to the members of the first upgrade group, the software upgrade prior to deploying the software upgrade to the members of the second upgrade group such that upgrade planning unit 135 may deploy the software upgrade to less important network devices 13 of SD-WAN 7 prior to deploying the software upgrade to more important network devices 13 of SD-WAN 7. In this fashion, upgrade planning unit 135 may "test" the software upgrade for problems using unimportant or relatively less important devices in a manner that exposes SD-WAN 7 to the least amount of potential service disruption, and only deploy the software upgrade to important devices once the software upgrade has been vetted for proper operability.

Figure 3:
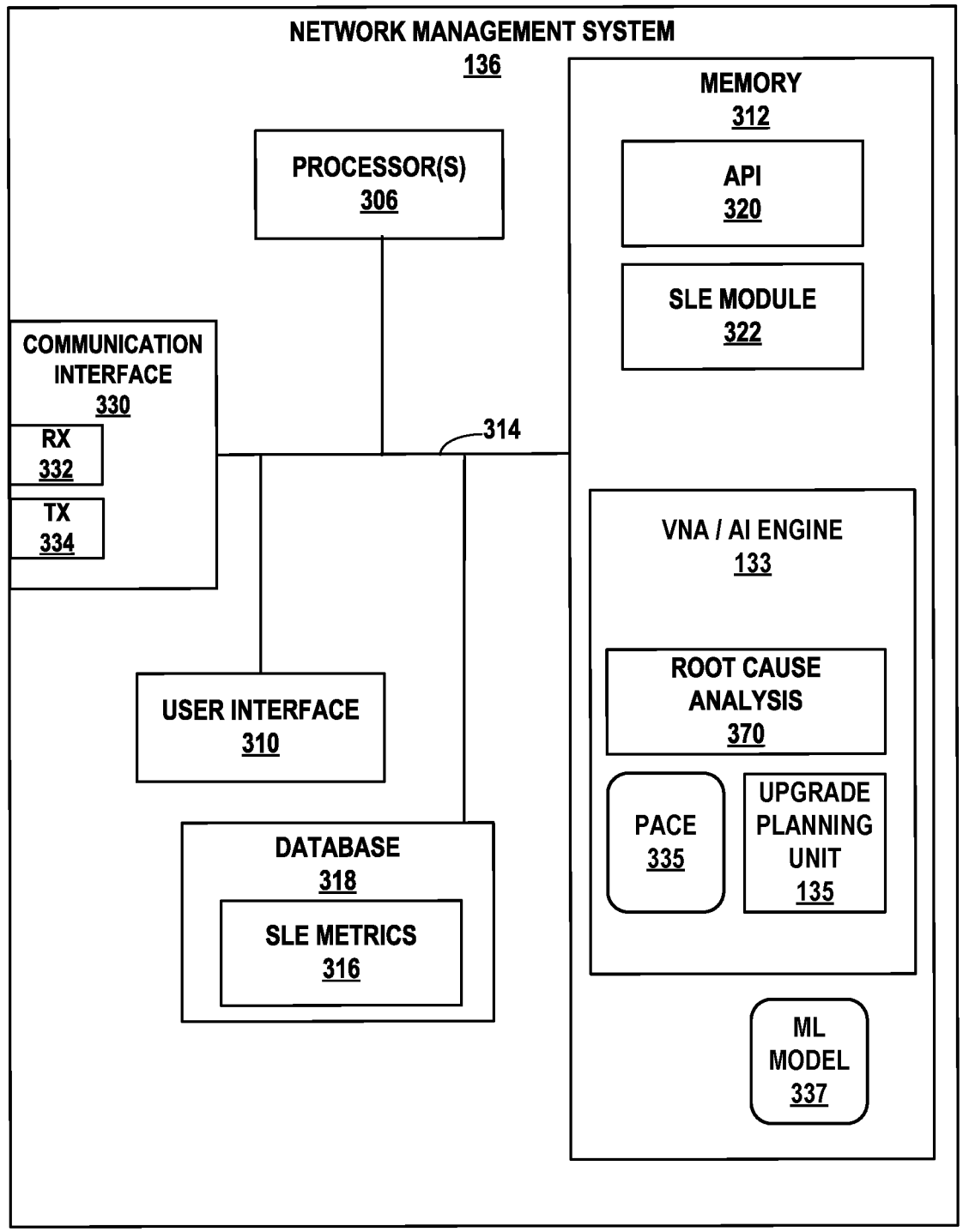
FIG. 3 is a block diagram illustrating an example network management system (NMS) configured in accordance with one or more techniques of this disclosure.

FIG. 3 is a block diagram illustrating example network management system (NMS) 136 configured in accordance with one or more techniques of this disclosure. NMS 136 may be used to implement, for example, NMS 136 in FIG. 1 or NMS 136 in FIG. 2. In such examples, NMS 136 is responsible for monitoring and management of one or more of network devices 13 of FIG. 1 or network devices 13 of FIG. 2. In this example, NMS 136 receives data collected from network devices 13 by cloud-based WAN assurance endpoint terminator 134, such as telemetry data, SLE metrics, and/or traffic metrics including application usage data, and health information, and analyzes the data for cloud-based WAN assurance of a network containing network devices 13. In some examples, NMS 136 may be part of another server shown in FIG. 1 or a part of any other server.

In some examples, in addition to monitoring network devices 13, NMS 136 is also responsible for monitoring and management of one or more wireless networks (not shown), in addition to monitoring network devices of service provider or other networks. In this example, NMS 136 also receives data collected by access points from user equipment, such as data used to calculate one or more SLE metrics, and analyzes this data for cloud-based management of the wireless networks. In this manner, a single NMS 136 can be used for management of both network devices 13, which may include virtualized network devices (e.g., software-based routers executing on a virtual machine or container), and wireless networks, for an end-to-end WAN assurance system viewable via a single cloud-based WAN assurance portal.

NMS 136 includes a communications interface 330, one or more processor(s) 306, a user interface 310, a memory 312, and a database 318. The various elements are coupled together via a bus 314 over which the various elements may exchange data and information.

Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 136 to a network and/or the Internet, such as any of network(s) 4, 6, 7, 11, 12, 20, and 22, as shown in FIG. 1, and/or any wide area networks or local area networks. Communications interface 330 includes a receiver 332 and a transmitter 334 by which NMS 136 receives/transmits data and information to/from any of network devices 13 and/or any other devices or systems forming part of SD-WAN 7 such as shown in FIG. 1. The data and information received by NMS 136 may include, for example, SLE-related or event log data received from network devices 13 and used by NMS 136 to remotely monitor the performance of network devices 13 and SD-WAN 7. In some examples, NMS 136 may further transmit data via communications interface 330 to any of network devices 13 to remotely manage SD-WAN 7.

Memory 312 includes one or more devices configured to store programming modules and/or data associated with operation of NMS 136. For example, memory 312 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an Application Programming Interface (API) 220, an SLE module 322, a virtual network assistant (VNA)/AI engine 133, a root cause analysis module 370, and upgrade planning unit 135. NMS 136 may also include any other programmed modules, software engines and/or interfaces configured for remote monitoring and management of network devices 13, including remote monitoring and management of any of network devices 13. NMS 136 may also include any other programmed modules, software engines and/or interfaces configured for remote monitoring and management of wireless networks, including remote monitoring and management of any of access points.

SLE module 322 enables set up and tracking of thresholds for SLE metrics for each network 102. SLE module 322 further analyzes SLE-related data collected by network devices 13. For example, cloud-based WAN assurance endpoint terminator(s) 134 collect SLE-related data from network devices 13 currently connected to SD-WAN 7. This data is transmitted to NMS 136, which executes by SLE module 322 to determine one or more SLE metrics for each of network devices 13 that have been onboarded to cloud-based WAN assurance system 130. The SLE metrics track whether the service level meets the configured threshold values for each SLE metric. Each metric may further include one or more classifiers. If a metric does not meet the SLE threshold, the failure may be attributed to one of the classifiers to further determine where the failure occurred. SLE metrics may include, for example, packet loss, jitter, latency, end-to-end processing time, and other user/device experience metrics such as WAN Link Health, Application Experience, and Gateway health.

VNA/AI engine 133 analyzes data received from network devices 13 as well as its own data to identify when undesired to abnormal states are encountered within SD-WAN 7, such as within network devices 13. For example, VNA/AI engine 133 may use root cause analysis module 370 to identify the root cause of any undesired or abnormal states. In some examples, root cause analysis module 370 utilizes artificial intelligence-based techniques to help identify the root cause of any poor SLE metric(s) occurring within SD-WAN 7. In addition, VNA/AI engine 133 may automatically invoke one or more corrective actions intended to address the identified root cause(s) of one or more poor SLE metrics. Examples of corrective actions that may be automatically invoked by VNA/AI engine 133 may include, but are not limited to, invoking API 320 to reboot one or more network devices 13. The corrective actions may further include restarting a switch and/or a router, invoke downloading of new software to a network device, switch, or router, etc. These corrective actions are given for example purposes only, and the disclosure is not limited in this respect. If automatic corrective actions are not available or do not adequately resolve the root cause, VNA/AI engine 133 may proactively provide a notification including recommended corrective actions to be taken by IT personnel to address the network error.

PACE 335 of the virtual network assistant may, in some examples, dynamically construct, train, apply and retrain unsupervised ML model(s) 337 to event data (SLE metrics 316) to determine whether the collected network event data represents anomalous behavior that needs to be further analyzed by root cause analysis module 370 of VNA/AI engine 133 to facilitate identification and resolution of faults.

PACE 335 may then apply the ML model to data streams and/or logs of newly collected data of various network event types (e.g., statistics, messages, SLE metrics or the like, herein referred to as "PACE" event data of event type) to detect whether the currently observed network event data with the stream of incoming data is indicative of a normal operation of the system or whether the incoming network event data is indicative of a non-typical system behavior event or trend corresponding to a malfunctioning network that requires mitigation.

When the application of the ML model by the proactive analytics and correlation engine to the network event data indicates that mitigation is required, NMS 136 may invoke a more complex root cause network analytics component of the virtual network assistant (VNA) to identify a root cause of the anomalous system behavior and, if possible, trigger automated or semi-automated corrective action. In this way, PACE 335 may construct and apply a ML model based on the particular complex network in which PACE 335 is deployed to determine whether to perform further, resource-intensive analysis on incoming streams of network event data collected (e.g., in real-time) from elements within the complex network system.

Further, along with identifying which issues require attention, some examples described herein may be configured to monitor messages exchanged within the complex network system as well as numerous operational counters, and statistics. During normal operation, the ratios between the values of different counters and statistics can assume values within a specific range of acceptable values, referred to herein as {Min, Max} range.

In accordance with the techniques of the disclosure, VNA 133 of NMS 136 includes upgrade planning unit 135. In some examples, upgrade planning unit 135 optionally computes, based at least in part on a number of instances of an application associated with network traffic forwarded by each network device 13 of FIG. 1, an upgrade score for the respective network device 13. The upgrade score is indicative of the importance of the respective network device 13 to delivery of the network traffic associated with the application due to the impact of various device-specific and network-specific characteristics. For example, a high upgrade score may indicate that a particular network device 13 has greater importance (e.g., greater importance) to the operability of SD-WAN 7 of FIG. 1, such that the network device 13 may cause disruption to delivery of the network traffic associated with the application if it were to go offline to perform a software upgrade. Conversely, a low upgrade score may indicate that a particular network device 13 has lesser importance (e.g., lesser importance) to the operability of SD-WAN 7, such that the network device 13 may not cause disruption to delivery of the network traffic associated with the application if the network device 13 were to go offline to perform a software upgrade.

In some examples, upgrade planning unit 135 may compute the upgrade score for each network device 13 based on other characteristics or factors in addition to or in the alternative to the number of instances of the application associated with the network traffic forwarded by each network device 13. For example, upgrade planning unit 135 may compute the upgrade score for each network device 13 based at least in part on the number of instances of the application associated with the network traffic forwarded by each network device 13, a health of the network device 13, an upgrade priority of the network device 13, a number of peer paths with which the network device 13 is provisioned, a role of the network device 13 within SD-WAN 7 (e.g., a hub, spoke, or mesh role within SD-WAN 7), or a high availability of one or more interfaces of the network device 13, separately or in any combination. In examples where upgrade planning unit 135 uses two or more characteristic to compute the upgrade score, upgrade planning unit 135 may average each individual characteristic to obtain the upgrade score, or alternatively weight each characteristic to obtain the upgrade score to affect a contribution of the characteristic to the upgrade score.

Upgrade planning unit 135 assigns, based on the upgrade score for each network device 13, network devices 13 into different upgrade groups. Each upgrade group includes, as members, one or more network devices 13 having upgrade scores within a predetermined range.

Upgrade planning unit 135 deploys, to the members of each upgrade group according to a priority of the upgrade group relative to the other upgrade groups of the plurality of upgrade groups, a software upgrade for installation. For example, members of a first upgrade group that have a lesser upgrade score may be indicative of the members having a lesser importance to delivery of the network traffic associated with the application. In contrast, members of a second upgrade group that have a greater upgrade score may be indicative of the members having a greater importance to delivery of the network traffic associated with the application. Therefore, upgrade planning unit 135 deploys, to the members of the first upgrade group, the software upgrade prior to deploying the software upgrade to the members of the second upgrade group such that upgrade planning unit 135 may deploy the software upgrade to less important network devices 13 of SD-WAN 7 prior to deploying the software upgrade to more important network devices 13 of SD-WAN 7.

Figure 4:
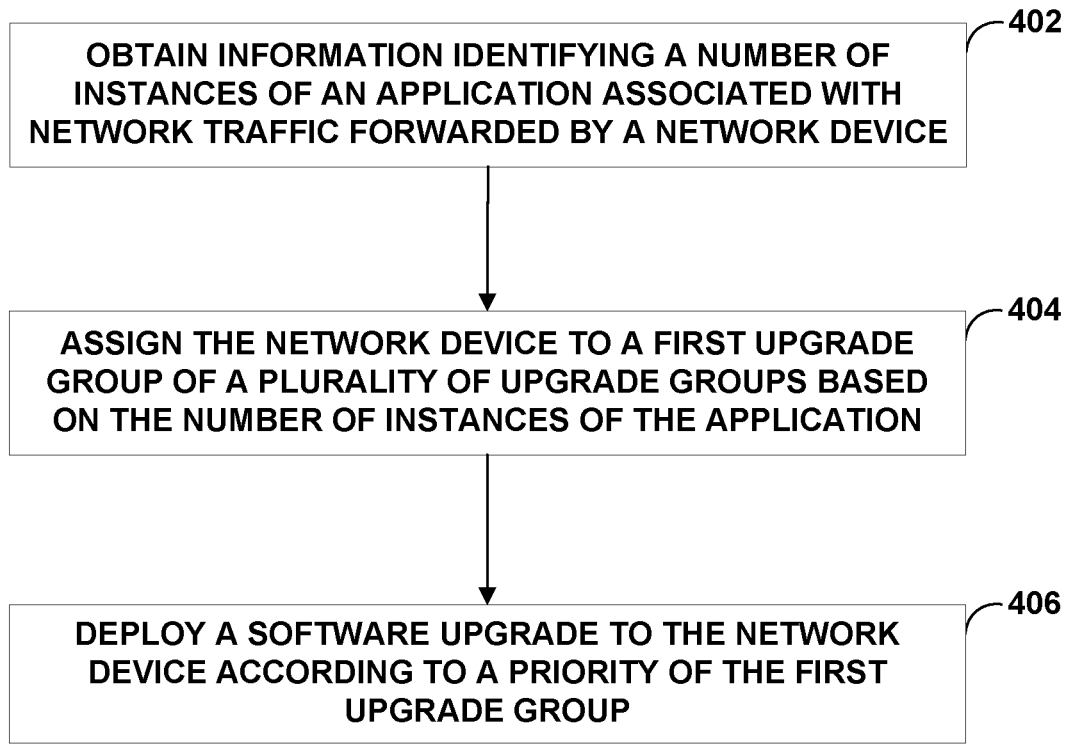
FIG. 4 is a flowchart illustrating an example operation in accordance with the techniques of the disclosure.

FIG. 4 is a flowchart illustrating an example operation in accordance with the techniques of the disclosure. Specifically, FIG. 4 depicts an example operation for identifying sets of network devices 13 to which to deploy a software upgrade based on an importance to SD-WAN 7 of each network device 13. FIG. 4 is described with respect to FIG. 1 for convenience.

However, the operation of FIG. 4 may be implemented using cloud-based WAN assurance system 130 of FIG. 2 or NMS 136 of FIG. 3.

As depicted in the example of FIG. 4, cloud-based WAN assurance system 130 obtains, for a first network device 13, information identifying a number of instances of an application associated with network traffic forwarded by the first network device 13 (402). In some examples, the first network device 13 uses deep packet inspection techniques to identify a client-side application associated with network traffic received and forwarded by the first network device 13. The first network device 13 forwards information identifying the number of instances of the application associated with the network traffic forwarded by the first network device 13 to cloud-based WAN assurance system 130.

In some examples, NMS 136 of cloud-based WAN assurance system 130 optionally computes, based at least in part on the number of instances of the application associated with the network traffic forwarded by the first network device 13, an upgrade score for the first network device 13. The upgrade score is indicative of the importance of the first network device 13 to delivery of the network traffic associated with the application due to the impact of various device-specific and network-specific characteristics. In some examples, NMS 136 may compute the upgrade score for the first network device 13 based on other characteristics in addition to or in the alternative to the number of instances of the application associated with the network traffic forwarded by each network device 13. For example, NMS 136 may compute the upgrade score for the first network device 13 based at least in part on the number of instances of the application associated with the network traffic forwarded by the first network device 13, a health of the first network device 13, an upgrade priority of the first network device 13, a number of peer paths with which the first network device 13 is provisioned, a role of the first network device 13 within SD-WAN 7, or a high availability of one or more interfaces of the first network device 13, separately or in any combination.

NMS 136 assigns, based at least in part on the number of instances of the application associated with the network traffic forwarded by the first network device 13, the first network device 13 to a first upgrade group (404). In some examples wherein NMS 136 computes an upgrade score based at least in part on the number of instances of the application associated with the network traffic forwarded by the first network device 13, NMS 136 may assign the first network device 13 to the first upgrade group based on the upgrade score computed for the first network device 13.

The first upgrade group includes, as members, one or more network devices 13 having upgrade scores within a predetermined range. NMS 136 deploys, to first network device 13 and the other members of the first upgrade group according to a priority of the upgrade group relative to the other upgrade groups of the plurality of upgrade groups, a software upgrade for installation (406). For example, members of a first upgrade group that have a lesser upgrade score may be indicative of the members having a lesser importance to delivery of the network traffic associated with the application. In contrast, members of a second upgrade group that have a greater upgrade score may be indicative of the members having a greater importance to delivery of the network traffic associated with the application. Therefore, NMS 136 deploys, to the members of the first upgrade group, the software upgrade prior to deploying the software upgrade to the members of the second upgrade group.

Figure 5:
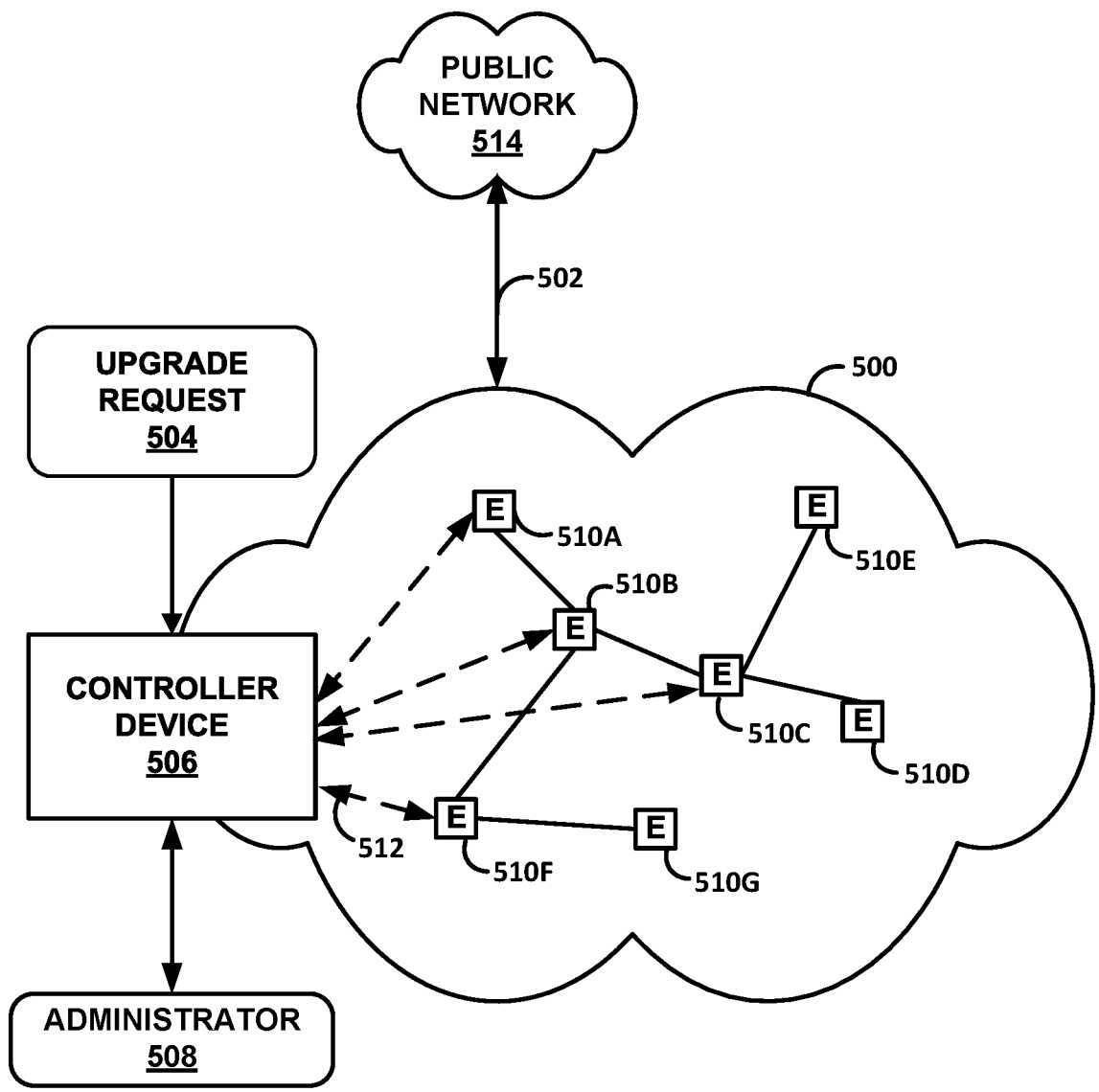
FIG. 5 is a block diagram illustrating an example including elements of an enterprise network that is managed using a controller device, in accordance with one or more techniques of this disclosure.

FIG. 5 is a block diagram illustrating an example including elements of an enterprise network 500 that are managed using a controller device 506, in accordance with one or more techniques of this disclosure. Managed elements 510A-510G (collectively, "elements 510") of enterprise network 500 include network devices interconnected via communication links to form a communication topology to exchange resources and information. Elements 510 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. In some examples, elements 510 are examples of devices 8, 11, 13, 16, or 18 of FIG. 1. In some examples, controller device 506 is an example of a network system, such as NMS 136 of cloud-based WAN assurance system 130 of FIG. 1.

While described in this disclosure as transmitting, conveying, or otherwise supporting packets, enterprise network 500 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 510 may be physical links (e.g., optical, copper, and the like), wireless, or any combination thereof. Enterprise network 500 may include many more elements 510 than shown in FIG. 1.

Enterprise network 500 is shown coupled to public network 514 (e.g., the Internet) via communication link 502. Public network 514 may include, for example, one or more client computing devices. Public network 514 may provide access to web servers, application servers, public databases, media servers, end-user devices, and other types of network resource devices and content. Although described for purposes of example with respect to an enterprise service network, the techniques of this disclosure are applicable to other types of networks, such as a branch network, a data center network, a service provider network, an Internet Service Provider network, or other type of network.

Controller device 506 is communicatively coupled to elements 510 via enterprise network 500. Controller device 506, in some examples, forms part of a device management system, although only one device of the device management system is illustrated for purpose of example in FIG. 1. Controller device 506 may be coupled either directly or indirectly to the various elements 510. Once elements 510 are deployed and activated, administrator 508 uses controller device 506 to manage the network devices using a device management protocol. One example device protocol is the Simple Network Management Protocol (SNMP) that allows controller device 506 to traverse and modify management information bases (MIBs) that store configuration data within each of managed elements 510.

In common practice, controller device 506, also referred to as a network management system (NMS) or NMS device, and elements 510 are centrally maintained by an Information Technology (IT) group of the enterprise. Administrator 508 interacts with controller device 506 to remotely monitor and configure elements 510. For example, administrator 508 may receive alerts from controller device 506 regarding any of elements 510, view configuration data of elements 510, modify the configurations data of elements 510, add new network devices to enterprise network 500, remove existing network devices from enterprise network 500, or otherwise manipulate the enterprise network 500 and network devices therein. Although described with respect to an enterprise network, the techniques of this disclosure are applicable to other network types, public and private, including LANs, VLANs, VPNs, and the like.

In some examples, administrator 508 uses controller device 506 or a local workstation to interact directly with elements 510, e.g., through telnet, secure shell (SSH), or other such communication sessions. That is, elements 510 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 512 with one of elements 510, e.g., element 510F, using controller device 506, to directly configure element 510F. In this manner, a user can provide commands in a format for execution directly to elements 510.

Further, administrator 508 can also create scripts that can be submitted by controller device 506 to any or all of elements 510. For example, in addition to a CLI interface, elements 510 also provide interfaces for receiving scripts that specify the commands in accordance with a scripting language. In a sense, the scripts may be output by controller device 506 to automatically invoke corresponding remote procedure calls (RPCs) on the managed elements 510. The scripts may conform to, e.g., extensible markup language (XML) or another data description language.

Administrator 508 uses controller device 506 to configure elements 510 to specify certain operational characteristics that further the objectives of administrator 508. For example, administrator 508 may specify, for an element 510, a particular operational policy regarding security, device accessibility, traffic engineering, quality of service (QoS), network address translation (NAT), packet filtering, packet forwarding, rate limiting, or other policies. Controller device 506 uses one or more network management protocols designed for management of configuration data within managed network elements 510, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741. Controller device 506 may establish NETCONF sessions with one or more of elements 510.

Controller device 506 may be configured to accept high-level configuration data, or intents, from administrator 508 (which may be expressed as structured input parameters, e.g., according to the Yet Another Next Generation (YANG) language, which is described in Bjorklund, "YANG-A Data Modeling Language for the Network Configuration Protocol (NETCONF)," Internet Engineering Task Force, RFC 6020, October 2010, available at tools.ietf.org/html/rfc6020). Controller device 506 may also be configured to output respective sets of low-level device configuration data, e.g., device configuration additions, modifications, and removals.

In some examples, controller device 506 may use YANG modeling for an intent data model and low-level device configuration models. This data may contain relations across YANG entities, such as list items and containers. In some examples, controller device 506 may convert a YANG data model into a database model, and convert YANG validations into data validations.

Controller device 506 may receive data from administrator 508 representing any or all of create, update, and/or delete actions with respect to the intent data model. Controller device 506 may be configured to use the same compilation logic for each of create, update, and delete as applied to the graph model.

To upgrade network devices, such as elements 510, the first step is to pull the image required for upgrade. Controller device 506 may receive, such as from an administrator or other user, upgrade request 504. Upgrade request 504 may include, for example, a command indicating an intent to upgrade the software of elements 510 from a software release "A" to a new or updated software release "B." The software of an element 510 may include an image. An image is a serialized copy of the state of a computer system stored in some non-volatile form such as a file. Upgrade request 504 may indicate a software upgrade image to be used for upgrading elements 510 to the updated software release "B." In response to receiving upgrade request 504, controller device 506 is configured to determine, e.g., based on device parameters of elements 510, to identify a subset of elements 510 to which to deploy the upgrade.

In accordance with the techniques of the disclosure, controller device 506 obtains, for a first element 510A, information identifying a number of instances of an application associated with network traffic forwarded by element 510A. In some examples, element 510A uses deep packet inspection techniques to identify a client-side application associated with network traffic received and forwarded by element 510A. Element 510A forwards information identifying the number of instances of the application associated with the network traffic forwarded by element 510A to controller device 506.

Controller device 506 assigns, based on the number of instances of the application associated with the network traffic forwarded by element 510A, element 510A to a first upgrade group. The first upgrade group includes, as members, one or more elements 510 having a number of instances of the application within a predetermined range. In some examples, the first upgrade group includes one or more elements 510 having no instances of the application associated with the network traffic forwarded by the respective element 510.

Controller device 506 deploys, to element 510A and the other members of the first upgrade group according to a priority of the upgrade group relative to the other upgrade groups of the plurality of upgrade groups, a software upgrade for installation. For example, members of a first upgrade group that have a fewer number of instances of the application associated with the network traffic forwarded by the respective member may be indicative of the members having a lesser importance to delivery of the network traffic associated with the application. In contrast, members of a second upgrade group that have a greater number instances of the application associated with the network traffic forwarded by the respective member may be indicative of the members having a greater importance to delivery of the network traffic associated with the application. Therefore, controller device 506 deploys, to the members of the first upgrade group, the software upgrade prior to deploying the software upgrade to the members of the second upgrade group.

Figure 6:
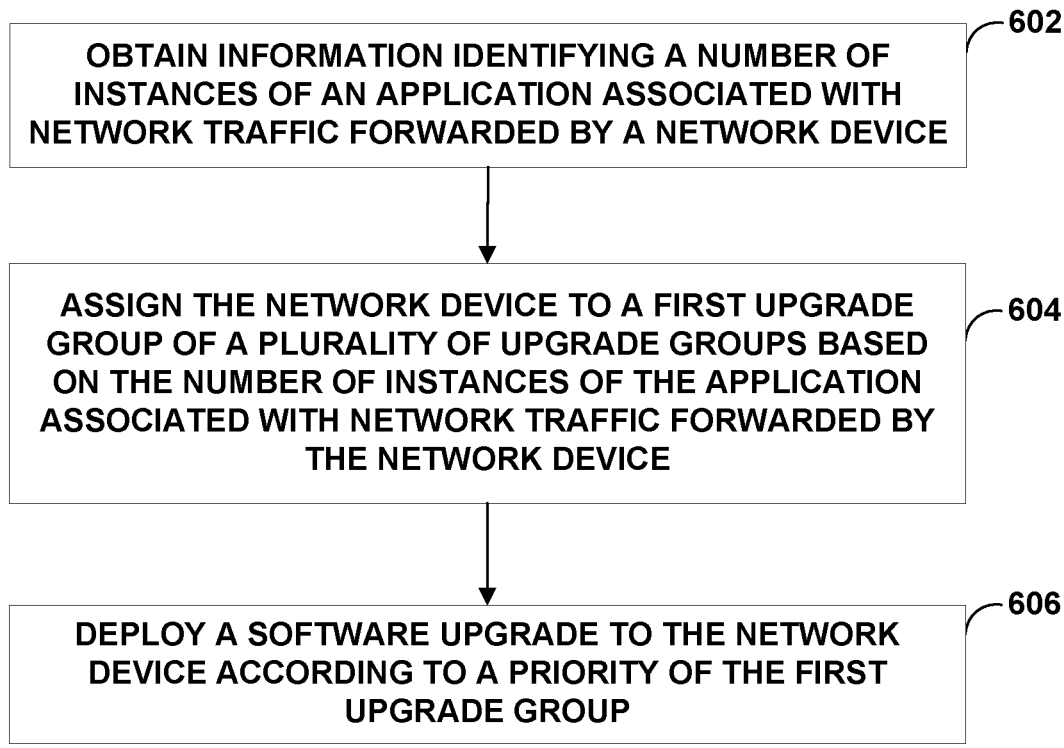
FIG. 6 is a flowchart illustrating an example operation in accordance with the techniques of the disclosure.

FIG. 6 is a flowchart illustrating an example operation in accordance with the techniques of the disclosure. Specifically, FIG. 6 depicts an example operation for identifying sets of elements 510 to which to deploy a software upgrade based on an importance delivery of network traffic of a customer of each element 510. FIG. 6 is described with respect to FIG. 5 for convenience. However, the operation of FIG. 6 may be implemented using cloud-based WAN assurance system 130 of FIG. 1, cloud-based WAN assurance system 130 of FIG. 2, or NMS 136 of FIG. 3.

As depicted in the example of FIG. 6, controller device 506 obtains, for a first element 510A, information identifying a number of instances of an application associated with network traffic forwarded by element 510A (602). In some examples, element 510A uses deep packet inspection techniques to identify a client-side application associated with network traffic received and forwarded by element 510A. Element 510A forwards information identifying the number of instances of the application associated with the network traffic forwarded by element 510A to controller device 506.

Controller device 506 assigns, based on the number of instances of the application associated with the network traffic forwarded by element 510A, element 510A to a first upgrade group (604). The first upgrade group includes, as members, one or more elements 510 having a number of instances of the application within a predetermined range. In some examples, the first upgrade group includes one or more elements 510 having no instances of the application associated with the network traffic forwarded by the respective element 510.

Controller device 506 deploys, to element 510A and the other members of the first upgrade group according to a priority of the upgrade group relative to the other upgrade groups of the plurality of upgrade groups, a software upgrade for installation (606). For example, members of a first upgrade group that have a fewer number of instances of the application associated with the network traffic forwarded by the respective member may be indicative of the members having a lesser importance to delivery of the network traffic associated with the application. In contrast, members of a second upgrade group that have a greater number instances of the application associated with the network traffic forwarded by the respective member may be indicative of the members having a greater importance to delivery of the network traffic associated with the application. Therefore, controller device 506 deploys, to the members of the first upgrade group, the software upgrade prior to deploying the software upgrade to the members of the second upgrade group.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A network system comprising processing circuitry configured to:
   obtain information identifying a number of instances of an application associated with network traffic forwarded by a network device of a plurality of network devices of a network, wherein the instances of the application are executed by client devices serviced by the network device in forwarding the network traffic;
   obtain information specifying a number of peer paths with which the network device is provisioned;
   assign, based on the number of instances of the application and the number of peer paths with which the network device is provisioned, the network device to a first upgrade group of a plurality of upgrade groups, wherein each of the plurality of upgrade groups is associated with a different relative priority; and
   deploy, to the network device according to a priority of the first upgrade group relative to a priority of other upgrade groups of the plurality of upgrade groups, a software upgrade.

2. The network system of claim 1, wherein to obtain the information identifying the number of instances of the application associated with the network traffic forwarded by the network device, the processing circuitry is configured to:
   receive, from the network device, the information identifying the number of instances of the application associated with the network traffic forwarded by the network device, wherein the network device performs deep packet inspection (DPI) of the network traffic forwarded by the network device to generate the information.

3. The network system of claim 1,
   wherein the processing circuitry is further configured to compute, based on the number of instances of the application associated with the network traffic forwarded by the network device, an upgrade score for the network device, and
   wherein to assign the network device to the first upgrade group, the processing circuitry is configured to assign, based on the upgrade score for the network device, the network device to a first upgrade group of a plurality of upgrade groups, wherein each upgrade group of the plurality of upgrade groups includes as members one or more network devices of the plurality of network devices having upgrade scores within a predetermined range.

4. The network system of claim 3, wherein the processing circuitry is further configured to compute the upgrade score for the network device based on a health of the network device, wherein network devices of the plurality of network devices with relatively worse health are given a more prioritized upgrade score than network devices having relatively better health.

5. The network system of claim 3, wherein the processing circuitry is further configured to compute the upgrade score for the network device based on an upgrade priority of the network device, wherein network devices of the plurality of network devices with a relatively higher upgrade priority are given a more prioritized upgrade score than network devices having a relatively lower upgrade priority.

6. The network system of claim 3, wherein the processing circuitry is further configured to compute the upgrade score for the network device based on the number of peer paths with which the network device is provisioned, wherein network devices of the plurality of network devices with a relatively lower number of peer paths are given a more prioritized upgrade score than network devices having a relatively higher number of peer paths.

7. The network system of claim 3, wherein the processing circuitry is further configured to compute the upgrade score for the network device based on a high availability status of one or more interfaces of the network device, wherein network devices of the plurality of network devices having a high availability status of one or more interfaces are given a more prioritized upgrade score than network devices not having a high availability status of one or more interfaces.

8. The network system of claim 3, wherein the processing circuitry is further configured to compute the upgrade score for the network device based on a role of the network device within the network of a plurality of roles, wherein the network system applies predefined rules indicating a manner in which each role of the plurality of roles is prioritized for upgrade.

9. The network system of claim 8,
   wherein the role of the network device is one of a hub, spoke, or mesh role within the network, and
   wherein network devices of the plurality of network devices having a spoke role are given a more prioritized upgrade score than network devices having a hub role.

10. The network system of claim 3, wherein to compute the upgrade score for the network device, the processing circuitry is configured to:
    identify a plurality of characteristics associated with the network device; and
    apply a corresponding weight to each characteristic of the plurality of characteristics to affect a contribution of the characteristic to the upgrade score.

11. The network system of claim 1, wherein to assign the network device to the first upgrade group, the processing circuitry is configured to assign the network device to the first upgrade group further based on a role of the network device.

12. The network system of claim 1, wherein to deploy the software upgrade to the network device, the processing circuitry is configured to deploy the software upgrade to the network device prior to deploying the software upgrade to the members of the other upgrade groups of the plurality of upgrade groups.

13. The network system of claim 1, wherein the network system comprises a cloud-based Wide-Area Network (WAN) assurance system.

14. A method comprising:
obtaining, by a network system, information identifying a number of instances of an application associated with network traffic forwarded by a network device of a plurality of network devices of a network, wherein the instances of the application are executed by client devices serviced by the network device in forwarding the network traffic;
obtaining, by the network system, information specifying a number of peer paths with which the network device is provisioned;
assigning, by the network system and based on the number of instances of the application and the number of peer paths with which the network device is provisioned, the network device to a first upgrade group of a plurality of upgrade groups, wherein each of the plurality of upgrade groups is associated with a different relative priority; and
deploying, by the network system and to the network device according to a priority of the first upgrade group relative to a priority of other upgrade groups of the plurality of upgrade groups, a software upgrade.

15. The method of claim 14, wherein obtaining the information identifying the number of instances of the application associated with the network traffic forwarded by the network device comprises:
receiving, by the network system and from the network device, the information identifying the number of instances of the application associated with the network traffic forwarded by the network device, wherein the network device performs deep packet inspection (DPI) of the network traffic forwarded by the network device to generate the information.

16. The method of claim 14,
wherein the method further comprises computing, by the network system and based on the number of instances of the application associated with the network traffic forwarded by the network device, an upgrade score for the network device, and
wherein assigning the network device to the first upgrade group comprises assigning, by the network system and based on the upgrade score for the network device, the network device to a first upgrade group of a plurality of upgrade groups, wherein each upgrade group of the plurality of upgrade groups includes as members one or more network devices of the plurality of network devices having upgrade scores within a predetermined range.

17. The method of claim 16, wherein computing the upgrade score for the network device is further based on one or more of:
a health of the network device, wherein network devices of the plurality of network devices with relatively worse health are given a more prioritized upgrade score than network devices having relatively better health;
an upgrade priority of the network device, wherein network devices of the plurality of network devices with a relatively higher upgrade priority are given a more prioritized upgrade score than network devices having a relatively lower upgrade priority;
the number of peer paths with which the network device is provisioned, wherein network devices of the plurality of network devices with a relatively lower number of peer paths are given a more prioritized upgrade score than network devices having a relatively higher number of peer paths;
a high availability status of one or more interfaces of the network device, wherein network devices of the plurality of network devices having a high availability status of one or more interfaces are given a more prioritized upgrade score than network devices not having a high availability status of one or more interfaces; or
a role of the network device within the network of a plurality of roles, wherein the network system applies predefined rules indicating a manner in which each role of the plurality of roles is prioritized for upgrade.

18. The method of claim 14, wherein assigning the network device to the first upgrade group comprises assigning the network device to the first upgrade group further based on a role of the network device.

19. The method of claim 14, wherein deploying the software upgrade to the network device comprises deploying the software upgrade to the network device prior to deploying the software upgrade to the members of the other upgrade groups of the plurality of upgrade groups.

20. Non-transitory, computer-readable media comprising instructions that, when executed, are configured to cause processing circuitry of a network system to:
obtain information identifying a number of instances of an application associated with network traffic forwarded by a network device of a plurality of network devices of a network, wherein the instances of the application are executed by client devices serviced by the network device in forwarding the network traffic;
obtain information specifying a number of peer paths with which the network device is provisioned;
assign, based on the number of instances of the application and the number of peer paths with which the network device is provisioned, the network device to a first upgrade group of a plurality of upgrade groups, wherein each of the plurality of upgrade groups is associated with a different relative priority; and
deploy, to the network device according to a priority of the first upgrade group relative to a priority of other upgrade groups of the plurality of upgrade groups, a software upgrade.

* * * * *